United States Patent
Jiang et al.

(10) Patent No.: US 10,419,244 B2
(45) Date of Patent: Sep. 17, 2019

(54) DEMODULATION REFERENCE SIGNAL MANAGEMENT IN NEW RADIO

(71) Applicant: QUALCOMM Incorporated, San Diego, CA (US)

(72) Inventors: Jing Jiang, San Diego, CA (US); Wanshi Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 21 days.

(21) Appl. No.: 15/614,280

(22) Filed: Jun. 5, 2017

(65) Prior Publication Data

US 2018/0097663 A1    Apr. 5, 2018

Related U.S. Application Data

(60) Provisional application No. 62/402,805, filed on Sep. 30, 2016.

(51) Int. Cl.
H04W 72/04  (2009.01)
H04L 5/00  (2006.01)
(Continued)

(52) U.S. Cl.
CPC ....... *H04L 25/0224* (2013.01); *H04B 7/0421* (2013.01); *H04B 7/0626* (2013.01);
(Continued)

(58) Field of Classification Search
None
See application file for complete search history.

(56) References Cited

U.S. PATENT DOCUMENTS

2013/0343299 A1   12/2013   Sayana et al.
2014/0036800 A1   2/2014   Frenne et al.
(Continued)

FOREIGN PATENT DOCUMENTS

CN   104247291 A   12/2014
CN   104272609 A   1/2015
(Continued)

OTHER PUBLICATIONS

Intel Corporation: "On PRB Bundling Enhancements for FD-MIMO Systems", 3GPP Draft; R1-152633, 3rd Generation Partnership Project (3GPP), Mobile Competence Centre; 650, Route Des Lucioles; F-06921 Sophia-Antipolis Cedex; vol. RAN WG1, No. Fukuoka, Japan; May 24, 2015, XP050972462, Retrieved from the Internet: URL:http://www.3gpp.org/ftp/Meetings_3GPP_SYNC/RAN1/Docs/, [retrieved on May 24, 2015], 4 pages.
(Continued)

*Primary Examiner* — Ajit Patel
(74) *Attorney, Agent, or Firm* — Arent Fox LLP

(57) ABSTRACT

Aspects of the present disclosure disclose techniques for implementing a wideband reference signal to improve the narrowband channel estimation performance associated with narrowband demodulation reference signal (DMRS) for the data channel in NR communications. Specifically, because the wideband reference signal may occupy wider bandwidth than the DMRS, the channel estimation realized may be more accurate than solely relying on the narrowband DMRS. In some examples, the wideband reference signal, which may be control reference signals (CRS), channel state information (CSI) reference signal (CSI-RS) in downlink or uplink sounding reference signal (SRS), may be associated with a corresponding narrowband DMRS in a data channel. The wideband reference signal may be either included in the control channel region or the data channel region.

26 Claims, 5 Drawing Sheets

(51) Int. Cl.
*H04L 25/02* (2006.01)
*H04B 7/0417* (2017.01)
*H04B 7/06* (2006.01)

(52) U.S. Cl.
CPC ............... *H04L 5/00* (2013.01); *H04L 5/005* (2013.01); *H04W 72/04* (2013.01)

(56) References Cited

U.S. PATENT DOCUMENTS

| | | | | |
|---|---|---|---|---|
| 2014/0169321 | A1* | 6/2014 | Imamura | H04W 52/146 370/329 |
| 2014/0204825 | A1* | 7/2014 | Ekpenyong | H04L 5/001 370/312 |
| 2014/0314041 | A1 | 10/2014 | Kim et al. | |
| 2015/0373739 | A1* | 12/2015 | Seo | H04W 72/04 370/329 |

FOREIGN PATENT DOCUMENTS

| | | | |
|---|---|---|---|
| EP | 2654333 | A1 | 10/2013 |
| EP | 2897407 | A1 | 7/2015 |
| WO | WO-2014/036154 | A1 | 3/2014 |
| WO | WO-2014/046516 | A1 | 3/2014 |
| WO | 2018059021 | A1 | 4/2018 |

OTHER PUBLICATIONS

International Search Report and Written Opinion—PCT/US2017/048028—ISA/EPO—dated Oct. 9, 2017. (16 total pages).
Samsung: "Remaining Issues on Quasi Co-location of Antenna Ports", 3GPP Draft; R1-123493, 3rd Generation Partnership Project (3GPP), Mobile Competence Centre; 650, Route Des Lucioles; F-06921 Sophia-Antipolis Cedex; France; vol. RAN WG1, No. Qingdao; Aug. 13, 2012-Aug. 17, 2012, Aug. 5, 2012, XP050661372, Retrieved from the Internet: URL:http://www.3gpp.org/ftp/tsg_ran/WG1_RL1/TSGR1_70/Docs/ [retrieved on Aug. 5, 2012], 7 pages.
ZTE Corporation et al., "On Forward Compatibility for New Radio Interface", 3GPP Draft; R1-166210, 3rd Generation Partnership Project (3GPP), Mobile Competence Centre; 650, Route Des Lucioles; F-06921 Sophia-Antipolis Cedex; vol. RAN WG1, No. Gothenburg, Sweden; Aug. 21, 2016, XP051140118, Retrieved from the Internet: URL:http://www.3gpp.org/ftp/Meetings_3GPP_SYNC/RAN1/Docs/ [retrieved on Aug. 21, 2016], 8 pages.
International Search Report and Written Opinion—PCT/CN2017/089499—ISA/EPO —dated Sep. 26, 2017.
International Search Report and Written Opinion—PCT/CN2018/088655—ISA/EPO —dated Aug. 17, 2018.

* cited by examiner

DEMODULATION REFERENCE SIGNAL MANAGEMENT IN NEW RADIO

CROSS-REFERENCE TO RELATED APPLICATION(S)

This application claims benefit of U.S. Provisional Application Ser. No. 62/402,805, entitled "DEMODULATION REFERENCE SIGNAL MANAGEMENT IN NEW RADIO" and filed Sep. 30, 2016, which is expressly incorporated by reference herein in its entirety.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond.

SUMMARY

Aspects of the present disclosure disclose techniques for implementing a wideband reference signal to improve the narrowband channel estimation performance associated with narrowband demodulation reference signal (DMRS) for the data channel in NR communications. Specifically, because the wideband reference signal may occupy wider bandwidth than the DMRS, the channel estimation realized may be more accurate than solely relying on the narrowband DMRS. In some examples, the wideband reference signal, which may be control reference signals (CRS), channel state information (CSI) reference signal (CSI-RS) in downlink or uplink sounding reference signal (SRS), may be associated with a corresponding narrowband DMRS in a data channel. In some aspects, the wideband reference signal may be either included in the control channel region or the data channel region. The transmitting device, in some examples, may further transmit a notification to a receiving device that indicates whether the wideband reference signal can be used for data channel demodulation based on the association.

In one example, a method for wireless communications is disclosed. The method may include determining whether to include a wideband reference signal for a subframe based on a presence or absence of downlink data scheduled in the subframe, and associating the wideband reference signal with a narrowband DMRS in a data channel based on the determining. The method may further include transmitting a notification to a receiving device that indicates whether the wideband reference signal can be used for data channel demodulation based on the association.

In another example, an apparatus for wireless communications is disclosed. The apparatus may include a memory configured to store instructions, and a processor communicatively coupled with the memory. The processor may be configured to execute the instructions to determine whether to include a wideband reference signal for a subframe based on presence or absence of downlink data scheduled in the subframe. The processor may further be configured to execute the instructions to associate the wideband reference signal with a narrowband DMRS in a data channel based on the determining. The processor may further be configured to transmit a notification to a receiving device that indicates whether the wideband reference signal can be used for data channel demodulation based on the association.

In another example, a computer readable medium for wireless communications is disclosed. The computer readable medium may include code for determining whether to include a wideband reference signal for a subframe based on a presence or absence of downlink data scheduled in the subframe, and associating the wideband reference signal with a narrowband DMRS in a data channel based on the determining. The computer readable medium may further include code for transmitting a notification to a receiving device that indicates whether the wideband reference signal can be used for data channel demodulation based on the association.

In another example, apparatus for wireless communications is disclosed. The apparatus may include means for determining whether to include a wideband reference signal for a subframe based on a presence or absence of downlink data scheduled in the subframe, and associating the wideband reference signal with a narrowband DMRS in a data channel based on the determining. The apparatus may further include means for transmitting a notification to a receiving device that indicates whether the wideband reference signal can be used for data channel demodulation based on the association.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
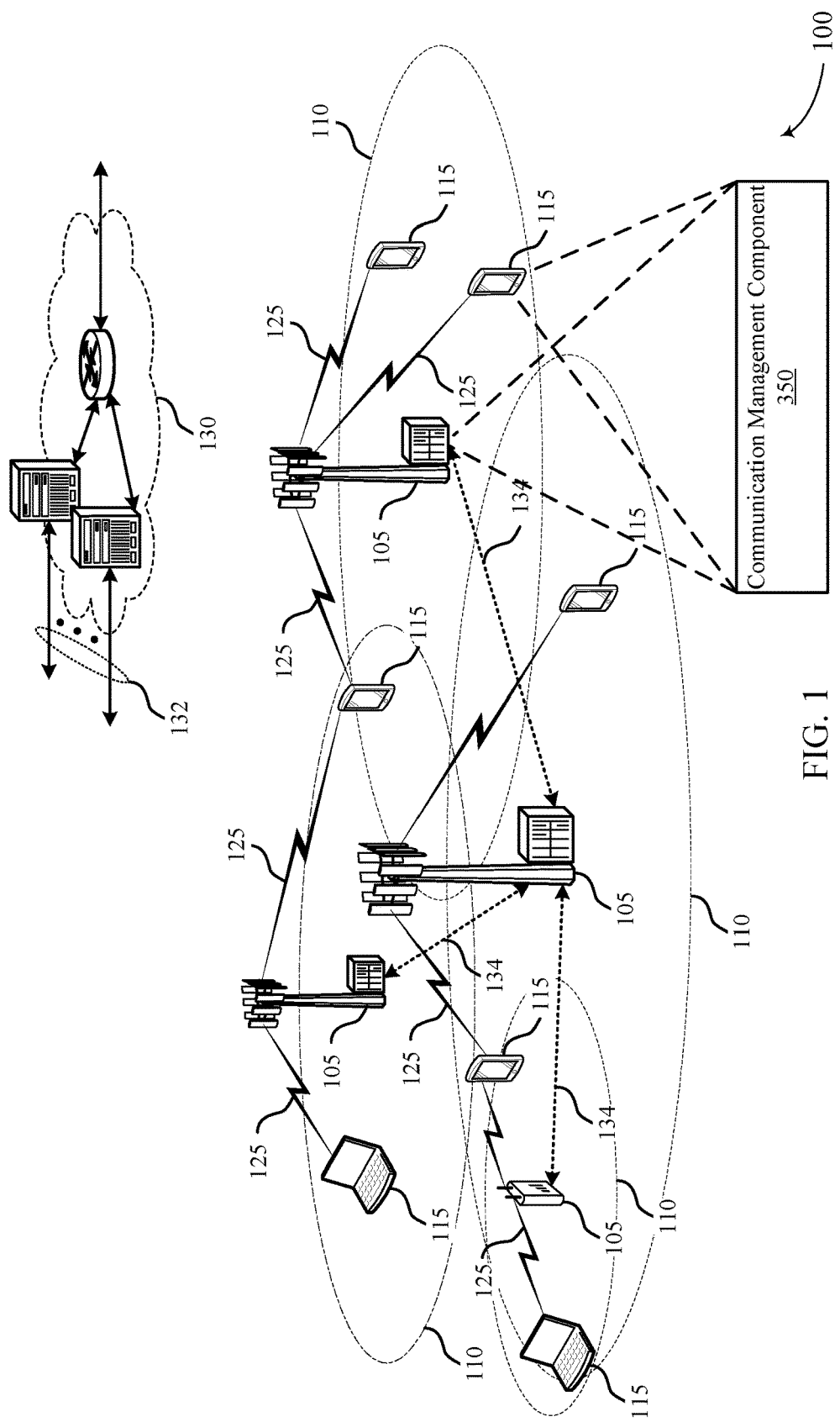
FIG. 1 illustrates an example of a wireless communications system in accordance with aspects of the present disclosure.

In several wireless communication systems, wireless receivers use one or more pilot signals to aid in demodulated the received signals. These pilot signals are commonly referred to as reference signals (RS). In the $3^{rd}$-Generation Partnership Project (3GPP) specifications for the Long-Term Evolution (LTE) wireless system, a receiving wireless device may have two different pilot signal types to use for data demodulation: common reference signals (CRS) and demodulation reference signals (DMRS).

CRS are pilot signals shared by a plurality of user equipment (e.g., mobile devices), and are used for control channel and data channel demodulation. In contrast, DMRS are intended for use by a single user equipment (UE) (e.g., a mobile device), and thus directly correspond to data targeted to that particular UE. The use of DMRS and multi-antenna transmission schemes make it possible for a transmitting device (e.g., base station) to beam-form (precode) the transmitted pilot signals as well as the corresponding data signals, based on radio channel characteristics for the link between the transmitting node antennas and the receiver, so that optimized performance is achieved for any particular UE. For purposes of this disclosure, the term reference signal and pilot signal may be used interchangeably.

In some systems, precoding by the transmitting device may be used to support spatial multiplexing and allowing multiple signal streams to be transmitted simultaneously. In order to determine optimal precoding vectors (e.g., antenna-mapping weights used to apply phase and amplitude corrections to data and pilot signals at each of two or more antennas in a multi-antenna transmission mode), the transmitting device (e.g., base station) needs to have knowledge of the propagation channel between the transmitting device antennas and the targeted UE. This is solved by allowing the UE to report channel state information (CSI), although other techniques for the network to learn the characteristics of the downlink channel are possible. Generally, wide-band non-precoded CRS may achieve better channel estimation than UE-specific precoded DMRS that, which at the expense of improved channel estimation, may employ non-code-book based precoding for enhanced precoding operation.

In systems operating according to the LTE specification, CRS must be transmitted in every downlink subframe, regardless of whether or not there is any downlink data transmission in the subframe. Such implementation may be resource intensive, and in absence of downlink data for one or more subframes, the inclusion of the CRS may waste valuable resources. Thus, in emerging 5G new radio (NR) communications technology, the devices may rely primarily on DMRS for signal demodulation, while omitting (or minimizing) the use of CRS in transmitted signals. The DMRS may be in the form of DMRS for control, open-loop multiple-input and multiple-output (MIMO) based DMRS, closed-loop MIMO based DMRS, etc. In the absence of the CRS, there is a need to improve channel estimation for DMRS data channels in 5G NR communication systems. Such a need may be particularly beneficial for UEs with unfavorable channel conditions (e.g., UEs at the cell-edge), and/or stringent Quality of Service (QoS) requirements (e.g., latency, reliability, etc.).

Accordingly, in absence of CRS that is typically used in the LTE systems, for 5G NR communications technology, aspects of the present disclosure rely on a wideband reference signal to improve the narrowband channel estimation performance associated with DMRS for the data channel. Specifically, because the wideband reference signal may occupy wider bandwidth than the DMRS, the channel estimation realized may be more accurate than solely relying on the narrowband DMRS. In some examples, inclusion of the wideband reference signal may be based on an ad-hoc determination (e.g., for each subframe) of whether a particular subframe includes any downlink data transmissions. If there is no data to be transmitted, the transmitting device may dynamically omit the wideband reference signal from the control channel or the data channel. However, if there is data to be transmitted, the transmitting device may include the wideband reference signal in one or more orthogonal frequency-divisional multiplexing (OFDM) symbols that precede the data channels in order to allow the receiving device to efficiently demodulate the transmitted signal.

Thus, in some examples, aspects of the present disclosure may associate the wideband reference signal, which may be CRS, CSI-RS in downlink or uplink SRS, with a narrowband DMRS in a data channel. In some aspects, the wideband reference signal may be either included in the control channel region or the data channel region. The transmitting device, in some examples, may further transmit a notification to a receiving device that indicates whether the wideband reference signal can be used for data channel demodulation based on the association.

Further aspects of the present disclosure include identifying a precoding resource block group (PRG) size for the narrowband DMRS such that the PRG size allows for the receiving device to assume precoding granularity for multiple resource blocks based on the PRG size. Particularly, in PRG bundling, a few contiguous resource blocks may be scheduled to one UE and the same precoding vector may be used for these continuous PRGs. As such, the UE may perform joint channel estimation across the plurality of contiguous resource blocks in the PRG to achieve higher channel estimation accuracy. In accordance with techniques of the present disclosure, the transmitting device may allocate resource blocks of a partial PRG to the receiving device such that the partial allocated PRG could assume the same precoding for the entire PRG. The receiving device may determine whether the partial allocated PRG can assume the same precoding for the larger set of resource blocks in the entire PRG based on signaling from the transmitting device. Thus, aspects of the present disclosure include a PRG management system that identifies the size and/or location of the resource blocks based on a function of one or more of tone-spacing, system bandwidth, service type (e.g., eMBB vs. URLLC), and or TTI length.

In some aspects, the PRG size for open-loop MIMO based DMRS may be different than the PRG size for the closed-loop MIMO based DMRS. In one or more examples, the PRG size for the open-loop MIMO based DMRS may be signaled to the receiving device using a one-bit indicator and the PRG size for closed-loop MIMO using a two-bit indicator. Although, specific bit utilization examples are provided herein, such examples should be construed as non-limiting as any variation of bits may be used to signal the PRG size for open-loop MIMO and closed-loop MIMO.

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 134 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links. In some examples, one or more UEs 115 may include a communication management component 350 to perform one or more techniques of the present disclosure. Components and sub-components of the communication management component 350 are described in detail with reference to FIG. 3.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, a relay, or some other suitable terminology. The geographic coverage area 110 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, 4G/LTE, 3G, Wi-Fi, Bluetooth, etc.), and thus there may be overlapping geographic coverage areas 110 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. In LTE/LTE-A networks, the term evolved node B (eNB) may be generally used to describe the base stations 105, while the term UE may be generally used to describe the UEs 115. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 115 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 115 with service subscriptions with the network provider. A femto cell may also cover a small geographic area (e.g., a home) and may provide restricted access and/or unrestricted access by the UEs 115 having an association with the femto cell (e.g., in the restricted access case, the UEs 115 in a closed subscriber group (CSG) of the base station 105, which may include the UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication network 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100. Additionally, a UE 115 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 115 may be able to communicate with various types of base stations 105 and network equipment including macro eNBs, small cell eNBs, relay base stations, and the like.

A UE 115 may be configured to establish one or more wireless communication links 125 with one or more base stations 105. The wireless communication links 125 shown in wireless communication network 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the communication links 125 may represent one or more broadcast channels.

In some aspects of the wireless communication network 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2A:
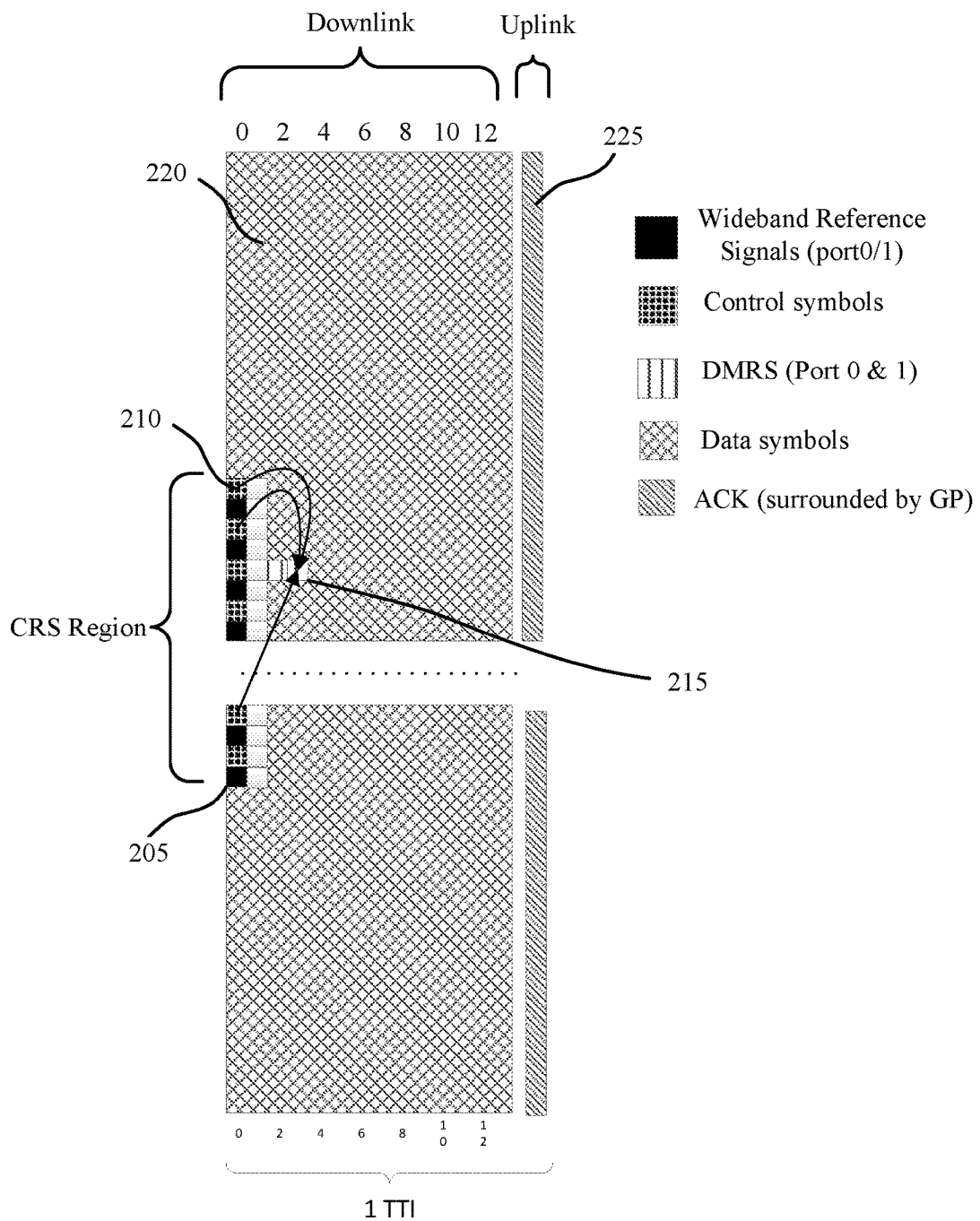
FIG. 2A illustrates an example of a resource grid for transmitting one or more data symbols to the receiving device utilizing the wideband reference signals in conjunction with the DMRS for aiding the receiving device to demodulate the received signal.

FIG. 2A is an example of a resource grid 200 for transmitting one or more subframes to the receiving device utilizing the wideband reference signals in conjunction with the DMRS that aids the receiving device to demodulate the received signal more efficiently. The resource grid may include one or more OFDM symbols. The OFDM symbols may include a plurality of resource elements, which may be the smallest discrete part of the frame and contains complex value representing control and data for a physical channel or signal.

As noted above, in emerging 5G NR communications technology, the devices may rely primarily on DMRS for signal demodulation, while omitting (or minimizing) the use of CRS from transmitted signals. The DMRS may be in the form of DMRS for control, open-loop MIMO based DMRS, closed-loop MIMO based DMRS, etc. In the absence of the CRS, there is a need to improve channel estimation for DMRS data channels in 5G NR communication systems.

Accordingly, in absence of traditional CRS that is typically used in the LTE systems, for 5G NR communications technology, aspects of the present disclosure rely on a wideband reference signal 205 to improve the narrowband channel estimation performance. The wideband reference signals may be associated with DMRS 215 for the data channel. It should be appreciated that the wideband reference signals may be included in either the control channel region or the data channel region. Specifically, because the wideband reference signal 205 may occupy wider bandwidth than the DMRS 215, the channel estimation realized may be more accurate than solely relying on the narrowband DMRS. While the wideband reference signal 205 may occupy a wider bandwidth than the DMRS, it may not be necessary for efficient implementation of the present techniques for the wideband reference signal to span the entire system bandwidth. Instead, the wideband reference signals may occupy a subset of the entire bandwidth that is still wider than the allocation for narrowband DMRS in the data channel region.

In the area where the wideband reference signal spans, the corresponding data resource blocks may be linked to the wideband reference signal such that the data resource blocks may use the wideband reference signal to enhance channel estimation and improve demodulation of the received signal. In the illustrated example, one resource block may be allocated to DMRS 215. In order to improve channel estimation, the resource block associated with the DMRS 215 may be precoded by wideband reference signal. In some examples, both DMRS 215 and data 220 may have a different power control level from the wideband reference signal.

In the resource blocks that wideband reference signal does not span over, the wideband reference signal channel statistics may still be used by the receiving device for parameter estimation (e.g., Doppler and delay spread, etc.). In some examples, inclusion of the wideband reference signal may be based on an ad-hoc determination (e.g., for each subframe) of whether the particular subframe includes any downlink data transmissions. If there is no data to be transmitted, the transmitting device may dynamically omit the wideband reference signal from the control channel or the data channel. However, if there is data to be transmitted, the transmitting device may include the wideband reference signal in one or more orthogonal frequency-divisional multiplexing (OFDM) symbols that precede the data channels in order to allow the receiving device to efficiently demodulate the transmitted signal.

Thus, in some examples, aspects of the present disclosure may associate the wideband reference signal 205, which may be CRS, CSI-RS in downlink or uplink SRS, with a narrowband DMRS in a data channel. In some aspects, the wideband reference signal 205 may be either included in the control channel region or the data channel region. The transmitting device, in some examples, may further transmit a notification to a receiving device that indicates whether the wideband reference signal can be used for data channel demodulation based on the association.

Thus, in some aspects, a UE may be indicated (or notified) via RRC or dynamic signaling whether or not the wideband reference signal may be either partially or fully used for data channel demodulation. In some aspects, the wideband reference signal may be combined with DMRS 215 for data channel for enhanced channel estimation. This may be particularly useful for open-loop based data channel transmission schemes. One technique for implementing the wideband reference signal utilization for channel estimation may include limiting the use of the wideband reference signal to a subset of channel/broadcast channels (e.g., only control channel associated with a particular DCI format). Such enhanced DMRS 215 usage (e.g., associating with wideband reference signal) may be dynamically enabled or disabled based on system requirements.

Additionally or alternatively, in some systems, precoding by the transmitting device may be used to support spatial multiplexing and allowing multiple signal streams to be transmitted simultaneously. In some examples, the transmitting device (e.g., base station) may determine optimal precoding vectors based on the propagation channel between the transmitting device antennas and the targeted UE. If the precoding for wideband reference signal is different from the precoding for the DMRS, the transmitting device may transmit the precoding vector information (either explicitly indicated or determined, or derived based on one or more rules) such that the UE 115 may properly demodulate the received signal.

Figure 2B:
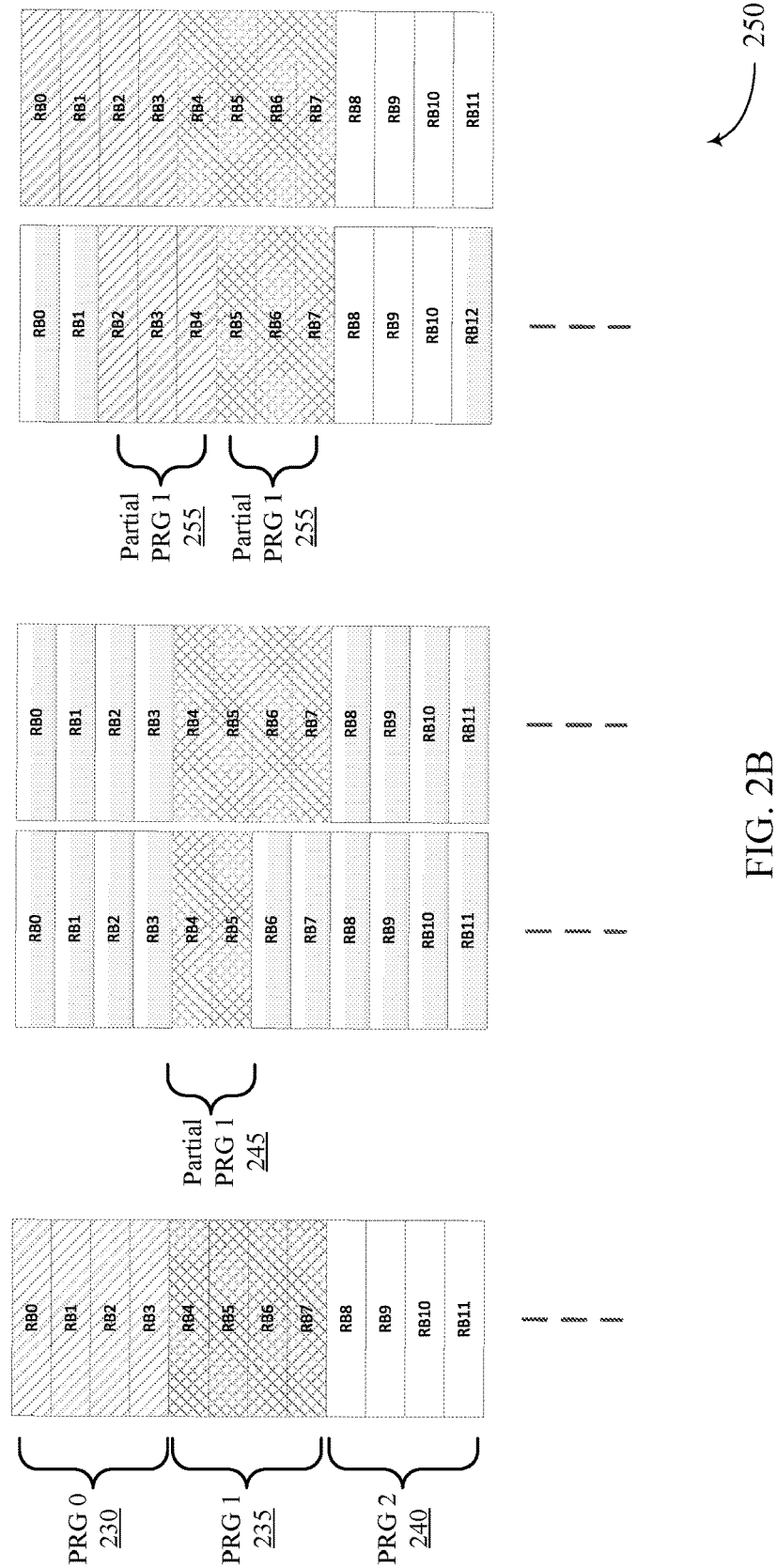
FIG. 2B illustrates an example of a resource block allocation with various PRG sizes in accordance with various aspects of the present disclosure.

FIG. 2B illustrates a resource block allocation with various PRG sizes in accordance with various aspects of the present disclosure. In some aspects of the present disclosure, the transmitting device may identify a PRG size for the narrowband DMRS such that the PRG size allows the receiving device to assume precoding granularity for multiple resource blocks based on the PRG size. In some aspects, in PRG bundling, a few contiguous resource blocks may be scheduled to one UE and the same precoding vector may be used for these continuous PRGs. As such, the UE may perform joint channel estimation across the plurality of contiguous resource blocks in the PRG to achieve higher channel estimation accuracy. In accordance with techniques of the present disclosure, the transmitting device may allocate resource blocks of a partial PRG to the receiving device such that the UE may assume, based on the partially allocated PRG, whether the same precoding is used for the remaining resource blocks in the PRG. The receiving device may determine whether the partial allocated PRG can assume the same precoding for the larger set of resource blocks in the entire PRG based on a signaling from the transmitting device. Thus, aspects of the present disclosure include a PRG management system that identifies the size and/or location of the resource blocks based on a function of one or more of tone-spacing, system bandwidth, service type (e.g., enhanced mobile broadband (eMBB) vs. ultra-reliable and low-latency communications (URLLC), and or TTI length.

In some aspects, the PRG size for open-loop MIMO based DMRS may be different than the PRG size for the closed-loop MIMO based DMRS. In one or more examples, the PRG size for the open-loop MIMO based DMRS may be signaled to the receiving device using a one-bit indicator and the PRG size for closed-loop MIMO using a two-bit indicator. Although, specific bit utilization examples are provided herein, such examples should be construed as non-limiting as any variation of bits may be used to signal the PRG size for open-loop MIMO and closed-loop MIMO.

Figure 3:
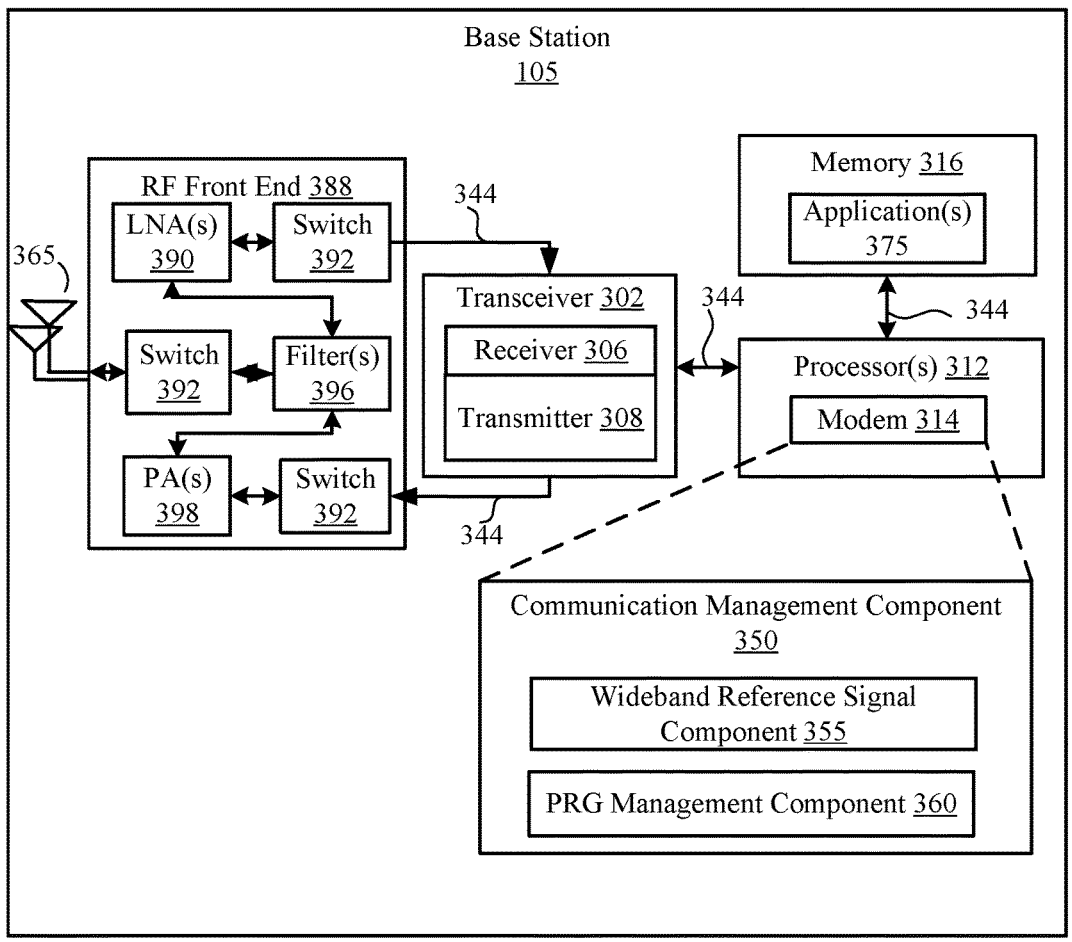
FIG. 3 illustrates an example of a schematic diagram of an aspect of an implementation of various components of a transmitting device (e.g., base station) in accordance with various aspects of the present disclosure.

FIG. 3 describes hardware components and subcomponents of a device that may be a transmitting device (e.g., a base station 105) for implementing one or more methods (e.g., method 400) described herein in accordance with various aspects of the present disclosure. For example, one example of an implementation of the transmitting device may include a variety of components, some of which have already been described above, but including components such as one or more processors 312 and memory 316 and transceiver 302 in communication via one or more buses 344, which may operate in conjunction with the communication management component 350 to enable signal generation that allows for one or more receiving device (e.g., UEs 115) to properly demodulate the received signal. In some examples, the communication management component 350 may be configured to determine whether to include and/or associate the wideband reference signal to a narrowband DMRS for channel estimation. Thus, the communication management component 350 may perform functions described herein related to including one or more methods of the present disclosure.

The one or more processors 312, modem 314, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to communication management component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with communication management component 350 may be performed by transceiver 302.

Also, memory 316 may be configured to store data used herein and/or local versions of applications 375 or communication management component 350 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining communication management component 350 and/or one or more of its subcomponents, and/or data associated therewith, when UE 115 is operating at least one processor 312 to execute communication management component 350 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one UE 115. Additionally, receiver 306 may process such received signals, and also may obtain measurements of the signals, such as, but not limited to, Ec/Io, SNR, RSRP, RSSI, etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, transmitting device may include RF front end 388, which may operate in communication with one or more antennas 365 and transceiver 302 for receiving and transmitting radio transmissions, for example, wireless communications transmitted by at least one base station 105 or wireless transmissions transmitted by UE 115. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 612.

As such, transceiver 302 may be configured to transmit and receive wireless signals through one or more antennas 365 via RF front end 388. In an aspect, transceiver 302 may be tuned to operate at specified frequencies such that transmitting device can communicate with, for example, one or more base stations 105 or one or more cells associated with one or more base stations 105. In an aspect, for example, modem 314 can configure transceiver 302 to operate at a specified frequency and power level based on the configuration of the transmitting device and the communication protocol used by modem 314.

In an aspect, modem 314 can be a multiband-multimode modem, which can process digital data and communicate with transceiver 302 such that the digital data is sent and received using transceiver 302. In an aspect, modem 314 can be multiband and be configured to support multiple frequency bands for a specific communications protocol. In an aspect, modem 314 can be multimode and be configured to support multiple operating networks and communications protocols. In an aspect, modem 314 can control one or more components of transmitting device (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with transmitting device as provided by the network during cell selection and/or cell reselection.

Figure 4:
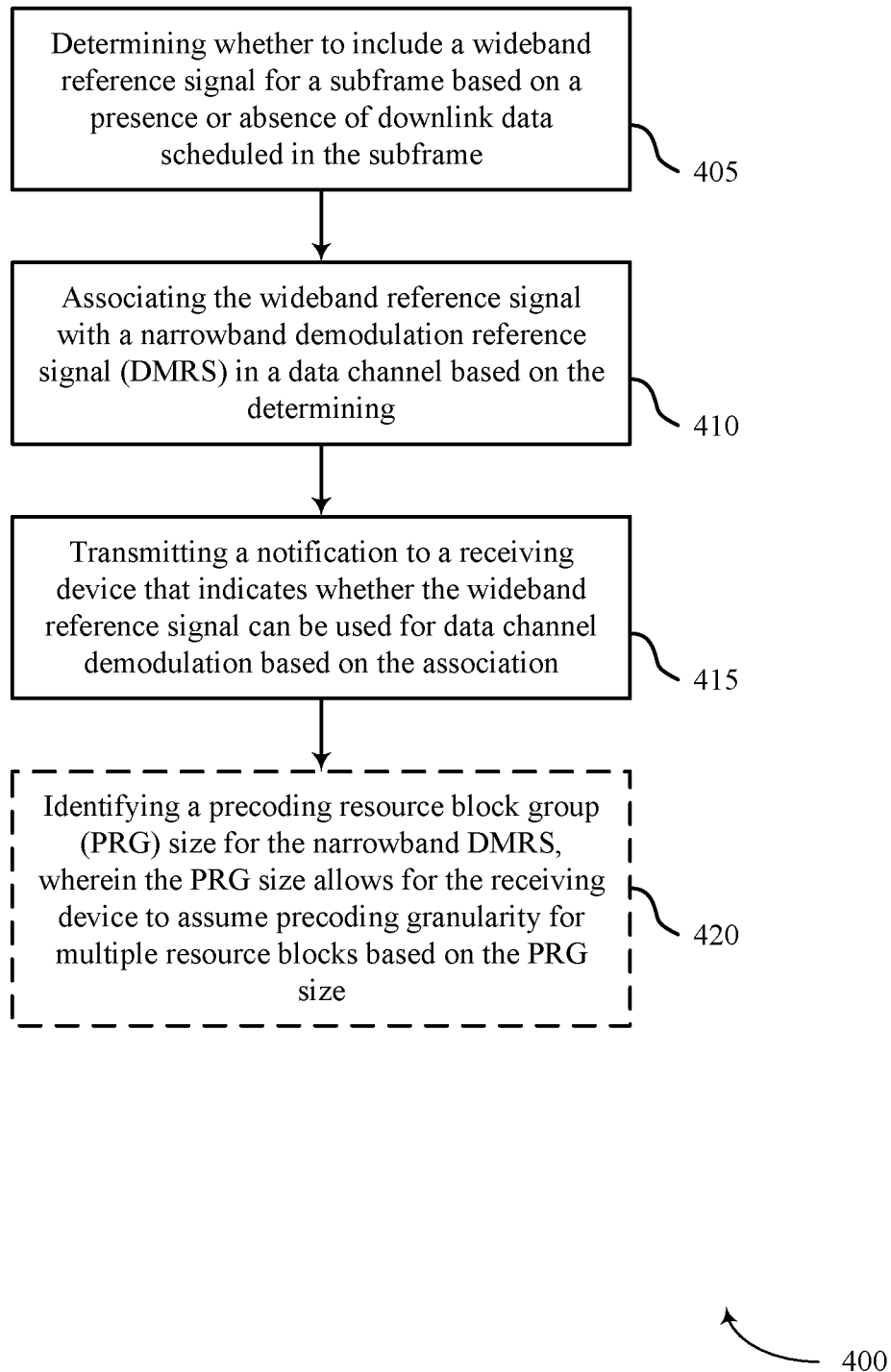
FIG. 4 illustrates an example of a method of wireless communication in accordance with aspects of the present disclosure

FIG. 4 is a flowchart of an example method 400 for transmitting subframes in wireless communications in accordance with aspects of the present disclosure. The method 400 may be performed using an apparatus (e.g., the base station 105). In some examples, the methods of the present disclosure may allow a receiving device (e.g., UE 115) to demodulate the received signal with improved channel estimation performance. Although the method 400 is described below with respect to the elements of the transmitting device (e.g., the base station 105), other components may be used to implement one or more of the steps described herein.

At block 405, the method may include determining whether to include a wideband reference signal for a subframe based on a presence or absence of downlink data scheduled in the subframe. In some aspects, the wideband reference signal may occupy a wider bandwidth than the narrowband DMRS. The wideband reference signal may be one of a control reference signal or CSI-RS in downlink, and SRS in the uplink. In some aspects, the wideband reference signal may or may not expand the entire system bandwidth. Aspects of block 405 may be performed by wideband reference signal component 355 described with reference to FIG. 3.

At block 410, the method may include associating the wideband reference signal with a narrowband DMRS in a data channel based on the determining. In some examples, associating the wideband reference signal with the narrowband DMRS may comprise attaching the wideband reference signal if the downlink data is present in the subframe. Alternatively, if the downlink data is absent from the subframe, the method may omit including the wideband reference signal in either the control channel region or the data channel region of the subframe. Aspects of block 410 may also be performed by wideband reference signal component 355 described with reference to FIG. 3.

At block 415, the method may include transmitting a notification to a receiving device that indicates whether the wideband reference signal can be used for data channel demodulation based on the association. Aspects of block 415 may also be performed by transceiver 302 described with reference to FIG. 3.

At block 420, the method may optionally include identifying a precoding resource block group (PRG) size for the narrowband DMRS. The PRG size may allow for the receiving device to assume precoding granularity for multiple resource blocks based on the PRG size. In some examples, the method may include determining whether a precoding for the wideband reference signal is different from the precoding for the narrowband DMRS, and transmitting a first precoding vector for the wideband reference signal and a second precoding vector for the narrowband DMRS based on the determining. The first and second precoding vectors can be either explicitly indicated or determined, or derived based on one or more rules (e.g., satisfaction of a condition). In some aspects, the PRG size for open-loop MIMO based DMRS may be different than the PRG size for closed-loop MIMO based DMRS. In one or more examples, the PRG size for the open-loop MIMO based DMRS may be signaled to the receiving device using a one-bit indicator and the PRG size for closed-loop MIMO using a two-bit indicator.

Additionally or alternatively, the method may include allocating resource blocks of a partial PRG to the receiving device (e.g., UE 115). In some aspects, whether the partial allocated PRG could assume the same precoding for the entire PRG may be dynamically signaled by the transmitting device. Aspects of block 420 may be performed by PRG management component 360 described with reference to FIG. 3.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
   determining whether to include a wideband reference signal for data channel demodulation for a subframe based on a presence or absence of downlink data scheduled in the subframe;
   associating the wideband reference signal with a narrowband demodulation reference signal (DMRS) in a data channel based on the determining, wherein the associating the wideband reference signal with the DMRS comprises attaching the wideband reference signal in a control channel region or a data channel region based on a determination that downlink data is present in the subframe; or omitting the wideband reference signal in the control channel region or the data channel region based on a determination that the downlink data is absent in the subframe; and
   transmitting a notification to a receiving device that indicates whether the wideband reference signal can be used for data channel demodulation based on the association.

2. The method of claim 1, further comprising:
   determining whether a precoding for the wideband reference signal is different from the precoding for the narrowband DMRS; and
   transmitting a first precoding vector for the wideband reference signal and a second precoding vector for the narrowband DMRS based on the determining, wherein the first precoding vector and the second precoding vector are either explicitly indicated or determined, or derived based on one or more conditions.

3. The method of claim 1, further comprising:
   identifying a precoding resource block group (PRG) size for the narrowband DMRS, wherein the PRG size allows for the receiving device to assume precoding granularity for multiple resource blocks based on the PRG size.

4. The method of claim 3, wherein the PRG size for open-loop multiple-input and multiple-output (MIMO) based DMRS is different than the PRG size for closed-loop MIMO based DMRS.

5. The method of claim 4, wherein the PRG size for the open-loop MIMO based DMRS is signaled to the receiving device using a one-bit indicator and the PRG size for closed-loop MIMO using a two-bit indicator.

6. The method of claim 3, further comprising:
   allocating resource blocks of a partial PRG to the receiving device, wherein the partial PRG allocated assumes same precoding for an entire PRG.

7. The method of claim 1, wherein the wideband reference signal occupies wider bandwidth than the narrowband DMRS.

8. The method of claim 1, wherein the wideband reference signal is one of a control reference signal or a channel state information (CSI) reference signal in downlink or SRS in an uplink communication.

9. An apparatus for wireless communications, comprising:
   a memory configured to store instructions;
   a processor communicatively coupled with the memory, the processor configured to execute the instructions to:
   determine whether to include a wideband reference signal for data channel demodulation for a subframe based on a presence or absence of downlink data scheduled in the subframe;
   associate the wideband reference signal with a narrowband demodulation reference signal (DMRS) in a data channel based on the determining, wherein the associate the wideband reference signal with the DMRS comprises attaching the wideband reference signal in a control channel region or a data channel region based on a determination that downlink data is present in the subframe; or omitting the wideband reference signal in the control channel region or the data channel region based on a determination that the downlink data is absent in the subframe; and
   transmit a notification to a receiving device that indicates whether the wideband reference signal can be used for data channel demodulation based on the association.

10. The apparatus of claim 9, wherein the processor is further configured to execute the instructions to:
    determine whether a precoding for the wideband reference signal is different from the precoding for the narrowband DMRS; and
    transmit a first precoding vector for the wideband reference signal and a second precoding vector for the narrowband DMRS based on the determining, wherein the first precoding vector and the second precoding vector are either explicitly indicated or determined, or derived based on one or more conditions.

11. The apparatus of claim 9, wherein the processor is further configured to execute the instructions to:
    identify a precoding resource block group (PRG) size for the narrowband DMRS, wherein the PRG size allows for the receiving device to assume precoding granularity for multiple resource blocks based on the PRG size.

12. The apparatus of claim 11, wherein the PRG size for open-loop multiple-input and multiple-output (MIMO) based DMRS is different than the PRG size for closed-loop MIMO based DMRS.

13. The apparatus of claim 12, wherein the PRG size for the open-loop MIMO based DMRS is signaled to the receiving device using a one-bit indicator and the PRG size for closed-loop MIMO using a two-bit indicator.

14. The apparatus of claim 11, further comprising:
    allocating resource blocks of a partial PRG to the receiving device, wherein the partial PRG allocated assumes same precoding for an entire PRG.

15. The apparatus of claim 9, wherein the wideband reference signal occupies wider bandwidth than the narrowband DMRS.

16. The apparatus of claim 9, wherein the wideband reference signal is one of a control reference signal, or a channel state information (CSI) reference signal in downlink or SRS in an uplink communication.

17. A non-transitory computer readable medium for wireless communications, comprising code for:
- determining whether to include a wideband reference signal for data channel demodulation for a subframe based on a presence or absence of downlink data scheduled in the subframe;
- associating the wideband reference signal with a narrowband demodulation reference signal (DMRS) in a data channel based on the determining, wherein the associating the wideband reference signal with the DMRS comprises attaching the wideband reference signal in a control channel region or a data channel region based on a determination that downlink data is present in the subframe; or omitting the wideband reference signal in the control channel region or the data channel region based on a determination that the downlink data is absent in the subframe; and
- transmitting a notification to a receiving device that indicates whether the wideband reference signal can be used for data channel demodulation based on the association.

18. The non-transitory computer readable medium of claim 17, further comprising code for:
- determining whether a precoding for the wideband reference signal is different from the precoding for the narrowband DMRS; and
- transmitting a first precoding vector for the wideband reference signal and a second precoding vector for the narrowband DMRS based on the determining, wherein the first precoding vector and the second precoding vector are either explicitly indicated or determined, or derived based on one or more conditions.

19. The non-transitory computer readable medium of claim 17, further comprising code for:
- identifying a precoding resource block group (PRG) size for the narrowband DMRS, wherein the PRG size allows for the receiving device to assume precoding granularity for multiple resource blocks based on the PRG size.

20. The non-transitory computer readable medium of claim 19, wherein the PRG size for open-loop multiple-input and multiple-output (MIMO) based DMRS is different than the PRG size for closed-loop MIMO based DMRS.

21. The non-transitory computer readable medium of claim 20, wherein the PRG size for the open-loop MIMO based DMRS is signaled to the receiving device using a one-bit indicator and the PRG size for closed-loop MIMO using a two-bit indicator.

22. The non-transitory computer readable medium of claim 19, further comprising:
- allocating resource blocks of a partial PRG to the receiving device, wherein the partial PRG allocated assumes same precoding for an entire PRG.

23. The non-transitory computer readable medium of claim 17, wherein the wideband reference signal occupies wider bandwidth than the narrowband DMRS.

24. The non-transitory computer readable medium of claim 17, wherein the wideband reference signal is one of a control reference signal or a channel state information (CSI) reference signal in downlink or SRS in an uplink communication.

25. An apparatus for wireless communications, comprising:
- means for determining whether to include a wideband reference signal for data channel demodulation for a subframe based on a presence or absence of downlink data scheduled in the subframe;
- means for associating the wideband reference signal with a narrowband demodulation reference signal (DMRS) in a data channel based on the determining, wherein the means for associating the wideband reference signal with the DMRS comprises means for attaching the wideband reference signal in a control channel region or a data channel region based on a determination that downlink data is present in the subframe; or means for omitting the wideband reference signal in the control channel region or the data channel region based on a determination that the downlink data is absent in the subframe; and
- means for transmitting a notification to a receiving device that indicates whether the wideband reference signal can be used for data channel demodulation based on the association.

26. The apparatus of claim 25, further comprising:
- means for determining whether a precoding for the wideband reference signal is different from the precoding for the narrowband DMRS; and
- means for transmitting a first precoding vector for the wideband reference signal and a second precoding vector for the narrowband DMRS based on the determining, wherein the first precoding vector and the second precoding vector are either explicitly indicated or determined, or derived based on one or more conditions.

* * * * *